United States Patent [19]
Hoover et al.

[11] Patent Number: 5,526,575
[45] Date of Patent: Jun. 18, 1996

[54] FISH MEASURING APPARATUS

[75] Inventors: George R. Hoover, Blue Springs; Harding L. M. Schumacher, Raytown, both of Mo.

[73] Assignee: GHS, Inc., Blue Springs, Mo.

[21] Appl. No.: 255,403

[22] Filed: Jun. 8, 1994

[51] Int. Cl.⁶ .............................. G01B 5/02; A01K 97/00
[52] U.S. Cl. .................................. 33/485; 43/4; 33/549; 33/511
[58] Field of Search ........................ 33/549, 485, 573, 33/484, 494; 43/4, 54.1; 206/315.11

[56] References Cited

U.S. PATENT DOCUMENTS

| | | |
|---|---|---|
| 461,106 | 10/1891 | Oberly . |
| 1,064,425 | 6/1934 | Bowman . |
| 2,502,816 | 4/1950 | Bennek . |
| 2,634,159 | 4/1953 | Agneberg . |
| 3,171,566 | 3/1965 | Mitchell . |
| 3,259,988 | 7/1966 | Lunn ........................................ 33/549 |
| 5,097,617 | 3/1992 | Craven ..................................... 33/511 |
| 5,148,607 | 9/1992 | Lasiter ..................................... 33/549 |
| 5,339,532 | 8/1994 | O'Keefe ................................... 33/511 |

*Primary Examiner*—Thomas B. Will
*Attorney, Agent, or Firm*—Hovey, Williams, Timmons & Collins

[57] ABSTRACT

A fish measuring apparatus includes an elongated base presenting a fish support surface having first and second opposed axial ends, and an upstanding wall connected to the base and extending perpendicular to the support surface. The wall is generally V-shaped, presenting a pair of side wall sections converging toward the first end of the support surface and opening toward the second end of the support surface, and an end section extending between the side wall sections at the first end and defining a stop. An indicium is provided on the support surface at a predetermined distance from the stop so that when a fish is placed on the surface against the stop, the length of the fish may be measured relative to the indicium.

9 Claims, 1 Drawing Sheet

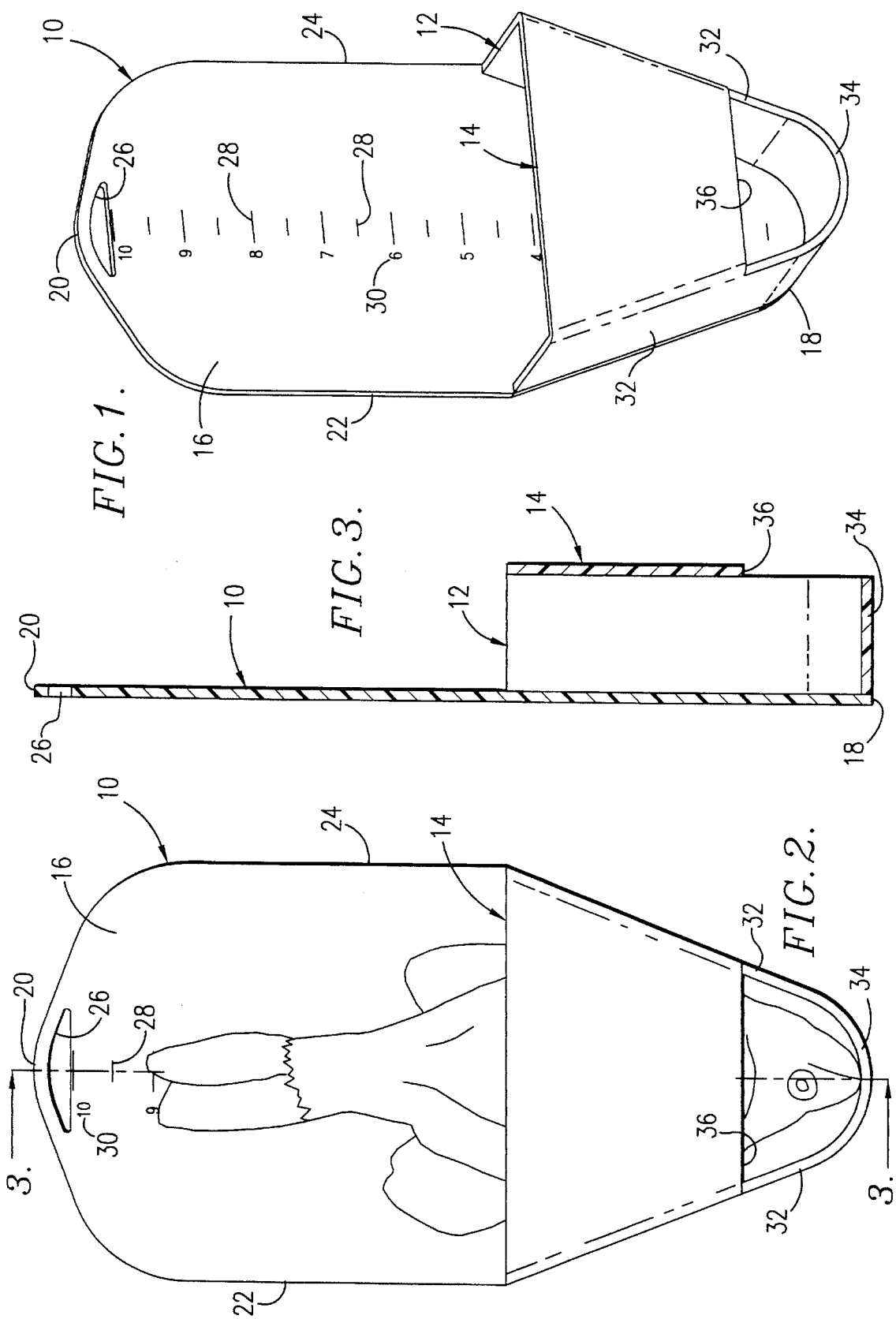

FISH MEASURING APPARATUS

BACKGROUND OF THE INVENTION

1. Field of the Invention

The present invention relates generally to fishing tackle and, more particularly, to a measuring apparatus for use in measuring the length of fish.

2. Discussion of the Prior Art

Conservation laws are in effect in most states regulating the number and size of fish which may be kept by sport fishermen without being subjected to penalties such as monetary fines, imprisonment, or the confiscation of equipment.

A typical conservation law will specify a particular minimum, maximum, or slot length for each type of fish, and only those fish satisfying the length specifications may be kept. For example, the Missouri Department of Conservation enforces a requirement that all crappie caught in certain lakes in Missouri must be at least 9 inches long before being kept. This requirement specifies that the measurement be made with the fish's mouth closed and with the tail fin of the fish pinched inward toward the scale on which the fish is measured.

It is known to provide a measuring tape for use in measuring the length of fish, and to mount the tape on an elongated board or the like, or to affix the tape directly to the gunwale or other structure of a boat. However, even with the tape conveniently mounted, it is still necessary for a fisherman to hold the fish against the scale during measurement while keeping the fish's mouth closed and tail pinched. As can be appreciated, this is much to ask of a person who is pitching about in a small boat and handling a slippery fish anxious to return to the lake.

OBJECTS AND SUMMARY OF THE INVENTION

It is an object of the present invention to provide a fish measuring apparatus which simplifies the task of measuring fish by supporting the weight of the fish, and aligning the mouth of the fish with a scale during measurement, thus freeing the hands of the fisherman for pinching the fish's tail or for otherwise assisting in the measurement.

Another object of the present invention is to provide a small, lightweight measuring apparatus having a scale and means for urging the mouth of the fish closed and for holding the fish against the scale so that the fish is not easily able to jump or flip free of the apparatus before a measurement can be taken.

In accordance with these and other objects evident from the following description of a preferred embodiment of the invention, a fish measuring apparatus is provided, which includes an elongated base presenting a fish support surface having first and second opposed axial ends, and an upstanding wall connected to the base and extending perpendicular to the support surface. The wall is generally V-shaped, presenting a pair of side wall sections converging toward the first end of the support surface and opening toward the second end of the support surface, and an end section extending between the side wall sections at the first end and defining a stop. At least one indicium is provided on the support surface at a predetermined distance from the stop so that when a fish is placed on the surface against the stop, the length of the fish may be measured relative to the indicium.

By providing a construction in accordance with the present invention, numerous advantages are obtained. For example, by providing a pair of angled side wall sections converging toward a stop at one end of the apparatus, a means is presented for urging the mouth of a fish closed when the head of the fish is positioned against the stop and for aligning the head of the fish with the scale. In addition, the upstanding wall and base together define a close-ended trough within which a fish is supported and retained during measurement, facilitating use of the apparatus.

Preferably, the apparatus also includes a cover plate extending over and connected between the side wall sections within a plane substantially parallel with the support surface. The cover plate is spaced from the support surface by a distance sufficient to permit a fish to be placed against the stop while restricting movement of the fish in a direction away from the support surface. Thus, not only is the mouth of the fish held closed in alignment with the scales, but the fish is also restricted from movement away from the support surface.

BRIEF DESCRIPTION OF THE DRAWING FIGURES

A preferred embodiment of the present invention is described in detail below with reference to the attached drawing figures, wherein:

FIG. 1 is a perspective view of a fish measuring apparatus constructed in accordance with the preferred embodiment;

FIG. 2 is a front elevational view of the apparatus, illustrating a fish in position for measurement; and FIG. 3 is a sectional view taken along line 3—3 of FIG. 2.

DETAILED DESCRIPTION OF THE PREFERRED EMBODIMENT

A fish measuring apparatus constructed in accordance with the preferred embodiment is illustrated in FIG. 1, and includes a base 10, an upstanding wall 12, and a cover plate 14, all of which are preferably formed of a transparent plastic material that is rigid, lightweight, easy to fabricate, and permits a fisherman to see a fish as it is held against the base.

The base 10 is a plate presenting a support surface 16 adapted to support a fish during measurement. The plate is generally rectangular in shape, presenting opposed first and second ends 18, 20, and side edges 22, 24 extending between the ends. As shown in FIG. 2, the side edges are parallel to one another adjacent the second end 20, and converge toward one another in a direction toward the first end 18. A hole 26 is provided in the base adjacent the second end 20, and defines a means by which the apparatus may be supported, e.g. by a hook or the like, when not in use.

At least one indicium 28 is formed in, printed on, affixed to, or otherwise provided on the base 10 at a predetermined distance from the first end 18 along the central longitudinal axis of the base 10 so that when a fish is placed on the support surface with the nose of the fish aligned with the first end 18, the length of the fish may be measured relative to the indicium. Preferably, several indicia 28 are provided on the support surface along the central longitudinal axis, each spaced half an inch from the next so that any fish positioned on the support surface may be measured with some degree of accuracy. In addition, numerals 30 may also be provided adjacent the indicia for facilitating measurement.

Where it is desired to provide a simple means for determining whether fish caught are of a minimum regulated length, it is possible to provide only a single indicium spaced from the first end by a distance equal to the regulated length. For example, if all crappie from a given lake must be 9 inches long before being kept, an indicium may be provided on the base at a distance of 9 inches from the first end 18 of the base so that any fish taken from the lake and measured must at least reach the indicium when measured, or be released.

As shown in FIG. 2, the upstanding wall 12 is connected to the base 10 and extends in a direction perpendicular to the support surface 16. Returning to FIG. 2, the wall is generally V-shaped, presenting a pair of side wall sections 32 extending along the side edges 22, 24 of the base and converging with the edges toward the first end 18 of the support surface. A radiused end section 34 of the upstanding wall extends between the side wall sections 32 at the first end of the support surface, and defines a stop against which the nose of a fish abuts during measurement, as shown in FIG. 2. Thus, the upstanding wall facilitates measurement of a fish by aligning the fish with the scale, and assisting in closing the fish's mouth when the fish is positioned against the stop.

Preferably, the height of the upstanding wall is substantially equal to the width of fish to be measured in the apparatus, and the cover plate is connected between the side wall sections of the upstanding wall, and extends in a plane substantially parallel with the support surface. As shown in FIG. 3, the upstanding wall is between 1 to 2.5 inches in height, and preferably about 1.5 inches. The cover plate is thus spaced from the support surface by the height of the side walls, and permits a fish to be placed against the stop while restricting movement of the fish in a direction away from the support surface. Although 1.5 inches has been found to be advantageous for use with an apparatus for measuring crappie, it is understood that the height of the cover plate above the support surface could be changed to accommodate different types of fish. In each case, it is only necessary to position the cover plate at a height which functions to restrict movement of the fish away from the support surface.

The cover plate 14 is trapezoidal, and extends over a substantial portion of the area within the V-shaped upstanding wall 12. However, an opening 36 is provided between the cover plate and the wall along the end section 34 of the wall. This opening 36 defines a drainage means for draining fluid from the apparatus so that water is not allowed to accumulate. Although a single opening is illustrated, it is also possible to extend the cover plate completely over the end section of the wall, and to form drainage openings in either the cover plate, wall, or base.

In use, when a fish is to be measured, it is placed against the base 10 with the head of the fish facing the first end of the base so that the nose of the fish can be slid beneath the cover plate 14 into contact with the stop 34. Contact between the nose of the fish and the upstanding wall of the apparatus urges the fish's mouth closed. At the same time, the cover plate 14 holds the fish close to the base, and restricts movement of the fish away from the support surface. Thus, in order to obtain a measurement after the fish is positioned, it is only necessary for the fisherman to pinch the tail of the fish together toward the indicia. When the apparatus is not in use, it may be stored in a tackle box or hung from a hook by the opening in the base.

Although the invention has been described with reference to the preferred embodiment illustrated in the attached figures, it is noted that substitutions may be made and equivalents employed herein without departing from the scope of the invention as recited in the claims.

What is claimed is:

1. A fish measuring apparatus comprising:

an elongated base presenting a fish support surface having first and second opposed axial ends and a longitudinal axis extending between the ends;

an upstanding wall connected to the base and extending perpendicular to the support surface, the wall being generally V-shaped, presenting a pair of side wall sections converging toward the first end of the support surface and opening toward the second end of the support surface, and an end section extending between the side wall sections at the first end and defining a stop, the end section being radiused about a point on the longitudinal axis of the base so that the mouth of a fish is positioned on the longitudinal axis of the base during measurement; and at least one indicium applied to the support surface at a predetermined distance from the stop along the longitudinal axis of the base so that when a fish is placed on the surface with the mouth of the fish against the stop, the length of the fish may be measured relative to the indicium.

2. An apparatus as recited in claim 1, further comprising:

a cover plate connected between the side wall sections and extending in a plane substantially parallel with the support surface, the cover plate being spaced from the support surface by a distance sufficient to permit a fish to be placed against the stop while restricting movement of the fish in a direction away from the support surface; and a drainage means for draining fluid from between the cover plate and the upstanding wall at the first end of the support surface.

3. An apparatus as recited in claim 1, wherein the elongated base includes a generally flat plate formed of a transparent material.

4. An apparatus as recited in claim 1, wherein the upstanding wall is formed of a transparent material.

5. An apparatus as recited in claim 2, wherein the cover plate is formed of a transparent material.

6. An apparatus as recited in claim 1, wherein a plurality of indicia are provided in order to permit the length of fish to be measured.

7. An apparatus as recited in claim 2, wherein the drainage means includes an opening between the cover plate and the upstanding wall adjacent the first end of the support surface.

8. An apparatus as recited in claim 2, wherein the cover is spaced from the support surface by a distance of at least 1 inch.

9. An apparatus as recited in claim 1, wherein the base includes a hole adjacent the second axial end by which the apparatus may be supported.

\* \* \* \* \*